United States Patent
Liu et al.

(10) Patent No.: US 7,081,743 B2
(45) Date of Patent: Jul. 25, 2006

(54) INTELLIGENT POWER SUPPLY AND CONTROL METHOD THEREOF

(75) Inventors: Chien-Hsing Liu, Lujhu Township, Taoyuan County (TW); Cheng-Fa Wang, Yilan (TW)

(73) Assignee: ICP Electronics Inc., Taipei Hsien (TW)

(*) Notice: Subject to any disclaimer, the term of this patent is extended or adjusted under 35 U.S.C. 154(b) by 0 days.

(21) Appl. No.: 10/995,922

(22) Filed: Nov. 22, 2004

(65) Prior Publication Data
US 2005/0140343 A1 Jun. 30, 2005

(30) Foreign Application Priority Data
Dec. 26, 2003 (TW) .............................. 92137056 A

(51) Int. Cl.
*G05F 3/16* (2006.01)
(52) U.S. Cl. .................. 323/317; 361/679; 361/684; 315/307; 315/224
(58) Field of Classification Search ................ 323/207, 323/317, 355; 361/679, 683, 684, 686; 363/51, 363/97, 21.12; 320/104; 315/307, 224
See application file for complete search history.

(56) References Cited

U.S. PATENT DOCUMENTS

| | | | |
|---|---|---|---|
| 5,621,299 A * | 4/1997 | Krall | 320/103 |
| 6,295,217 B1 * | 9/2001 | Yang et al. | 363/49 |
| 2004/0037019 A1 * | 2/2004 | Yokozawa et al. | 361/78 |

* cited by examiner

*Primary Examiner*—Haissa Philogene
(74) *Attorney, Agent, or Firm*—Thomas, Kayden, Horstemeyer & Risley

(57) ABSTRACT

Intelligent power supply and control method thereof. A power supply for altering an output power by detecting a power requirement of an electronic device and the electronic device having a memory. The power supply comprises a converter, a control device and a switch. The converter is able to convert an input power into the output power applied to the electronic device. The control device is coupled to the converter reads power information concerning the power requirement from the electronic device and accordingly controlling the converter to adjust the output power. The switch coupled both the converter and the control device receives a control signal of the control device and switches an output port of the power supply to the converter to transfer the output power from the converter to the electronic device.

12 Claims, 5 Drawing Sheets

INTELLIGENT POWER SUPPLY AND CONTROL METHOD THEREOF

BACKGROUND

The invention relates to a power supply and a control method thereof, and more particularly to a power supply and a control method which can detect a power requirement of an electronic device and accordingly provide an output power thereto.

Currently, conventional power supplies provide a fixed output voltage or a manually-selectable output voltage according to output numbers of the power supplies.

FIG. 1 is a block diagram of a conventional power supply with a fixed output voltage. The power supply 1 coupled to an alternating current (AC) power source outputs direct current (DC) power to an electronic device 2 at a predetermined voltage by a transformer 11 and a rectifier 12.

FIG. 2 is a block diagram of a conventional power supply with a plurality of selectable output voltages. The variable output power supply 3 is capable of providing different levels of output power to meet power requirements for various electronic devices. For example, a potential selector 32 can be manually switched to various voltage levels for the power requirements of the electronic device 20, and thus the power supply outputs power at a selected potential to the electronic device 20.

With manual determination or selection of output voltage, however, it is easy to erroneously execute and generate mismatched output voltage, potentially damaging the device. For example, a 5-volt output power from a power supply to an electronic device requiring power of 12 volts causes the electronic device to malfunction. Similarly, device damage, such as circuit burnout, occurs if 12 volts of power is provided to a 5-volt electronic device.

Thus, the invention is to prevent the mismatched output voltage arising from manual operation of the conventional power supply, thereby improving convenience and safety of utility.

SUMMARY

An aspect of the invention provides a power supply capable of detecting power requirements based on power information from an electronic device, and selecting an output power accordingly. A memory of the electronic device is used to store the information concerning the power requirements.

An embodiment of the power supply comprises a converter, a control device, and a switch. An output power generated from the power supply is transformed into an input power by means of the converter to be applied to an electronic device coupled to the power supply. The control device coupled to the converter accesses the power information concerning the power requirements of the electronic device, accordingly controls the converter to adjust the output power, and outputs a control signal after adjusting the output power. The switch is coupled to the converter and the control device to switch an output port of the power supply to the converter after receiving the control signal, thereby transferring the output power from the converter to the electronic device.

In the embodiment, the power supply is also capable of returning the output port of the power supply to its original state, for efficient processing of subsequent detections. Thus, the power supply further comprises a current detector to detect whether the output power is applied to the electronic device. The switch disconnects the converter from an output port of the power supply and couples the control device to the output port when the output power is not applied to the electronic device.

Another aspect of the invention also sets forth an electronic device to provide the power information to a power supply. The electronic device comprises a major circuit, an input port, a memory storing the power information, and a gate switch including a first gate device and a second gate device. The first gate device is coupled between the input port and the memory, and the second gate device is coupled between the input port and the major circuit.

When the voltage of the input port meets first requirements, the memory is coupled with the input port by means of the gate switch as the power information is read from the input port. When the voltage of the input port meets second requirements, the input port is coupled with the major circuit by means of the gate switch so that the power supply provides output power to the major circuit for normal operation.

Furthermore, another aspect of the invention provides a control method of the power supply. An electronic device is coupled to a power supply. An input power from an external power source is then converted into an output power. Power information from the electronic device is read. An adjusted output power is finally applied to the electronic device.

Thus, the power supply control method detects automatically the connected electronic device and outputs the appropriate adjusted power additionally, thus preventing problems arising from manual operation.

BRIEF DESCRIPTION OF THE DRAWINGS

An embodiment of the invention will become more fully understood by referring to the following detailed description and accompanying drawings, wherein.

DETAILED DESCRIPTION

An aspect of the invention provides a power supply capable of detecting power requirements based on information from an electronic device, and selecting a power output accordingly.

Figure 1:
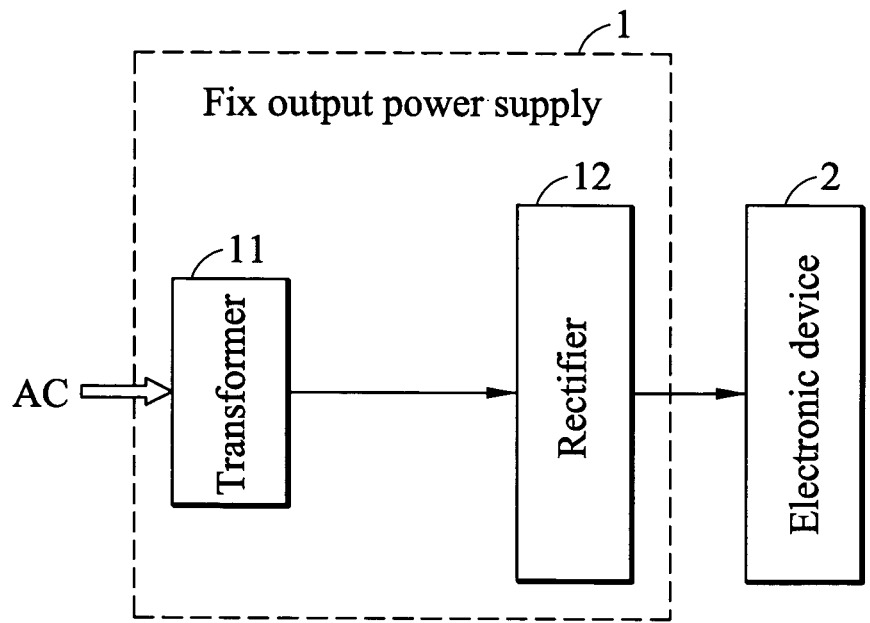
FIG. 1 is a block diagram of a conventional fixed output power supply.
Figure 2:
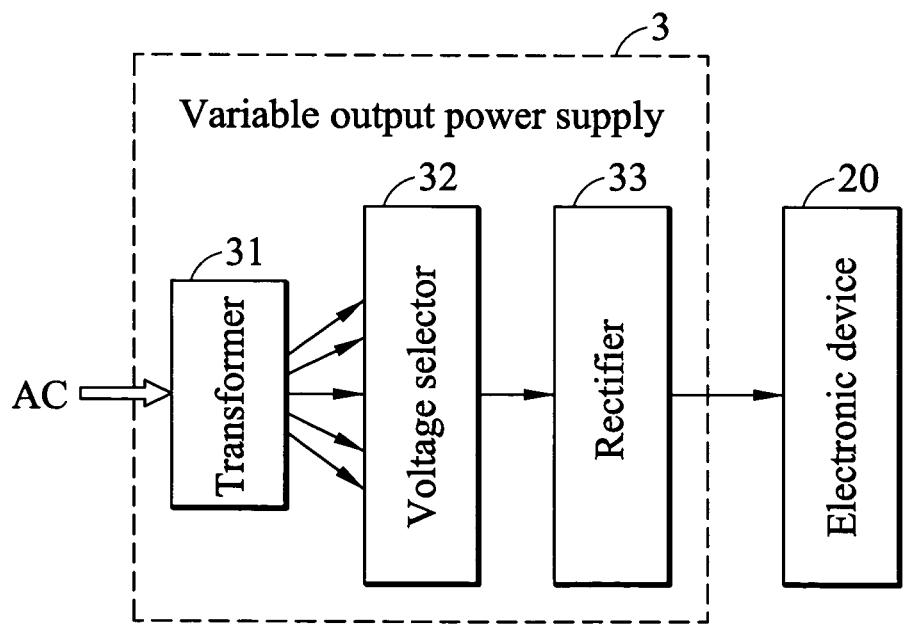
FIG. 2 is a block diagram of a conventional power supply with selectable output voltage.
Figure 3:
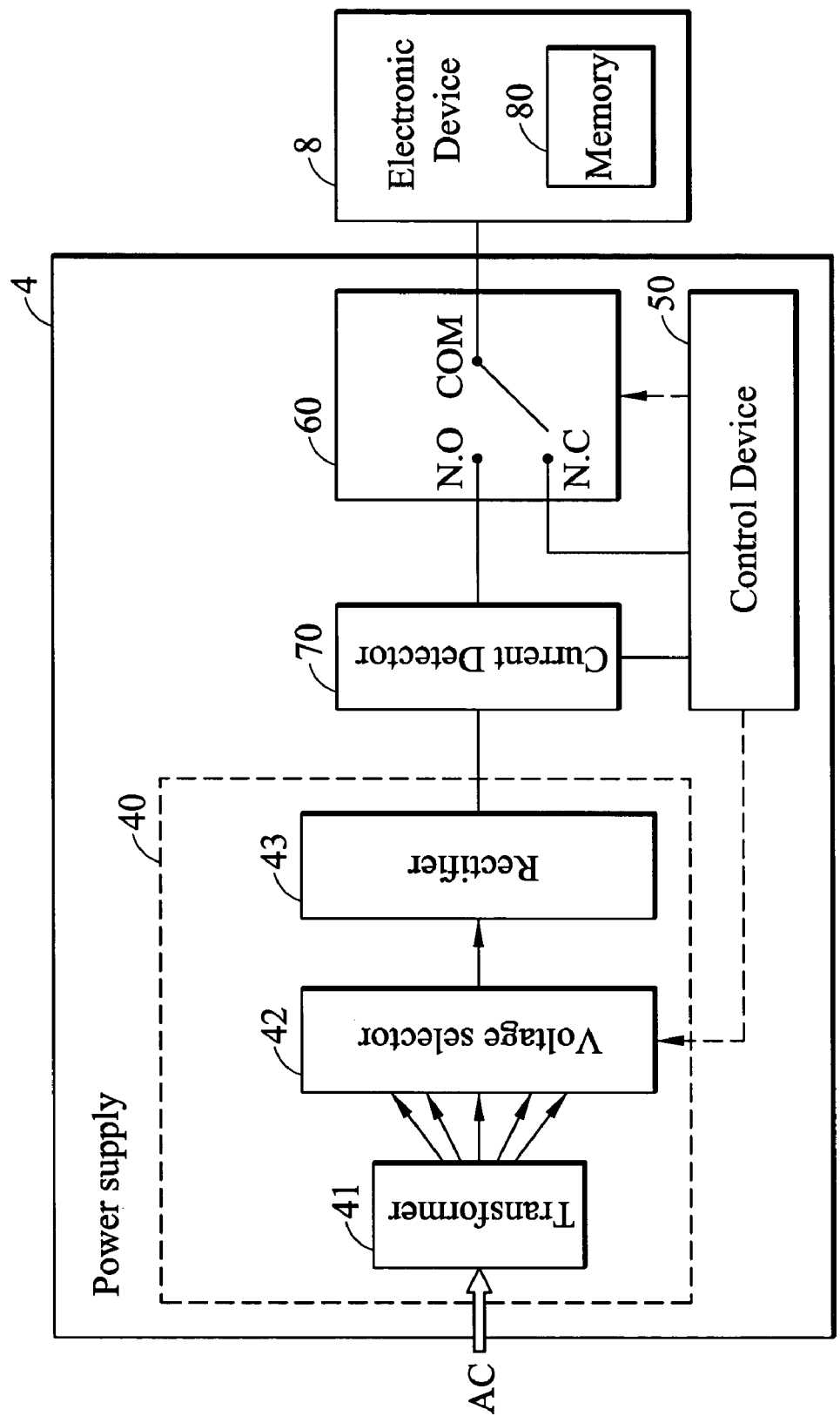
FIG. 3 is a schematic diagram of a power supply of the invention.

FIG. 3 is a schematic diagram of a power supply of an embodiment of the invention. The power supply 4 comprises a converter 40, a control device 50, a switch 60, and a current detector 70. When an input port and an output port of the power supply 4 are coupled to an alternative power current (AC) power source and a electronic device 8 having a memory 80, respectively, and a common node COM and a normally closed node N.C of the switch 60 are coupled to the output port of the power supply 4 and a detection node of the control device 50, respectively, the control device 50 detects power information stored in the memory 80 via the switch 60. The power information comprises a rated potential, a rated current, or a rated power, of the electronic device 8.

In the present embodiment, the memory 80 is a non-volatile random access memory (NVRAM), and the switch 60 is an electrical or a mechanical switch such as a relay or an optical coupler.

When obtaining the power information, the control device 50 first controls the potential selector 42 to select an output power of a transformer 41 corresponding to the power information. The rectifier 43 rectifies and stabilizes the output power of the potential selector 42, and then the control device 50 controls the switch 60 to change a passage from the normally closed node N.C to a normally opened node N.O. Thus, the converter 40 can provide an adjusted output power to the electronic device 8 via the switch 60.

The power supply 4 further comprises a current detector 70 to detect whether the output power is applied to the electronic device 8. Additionally, the current detector 70 can operate in coordination with the control device 50 to determine whether the power supply 4 unloads the electronic device 8, whereby the passage of the switch 60 can be returned to it original state. For example, when the power supply 4 unloads the electronic device 8, the current of the current detector 70 is zero, accordingly the control device 50 adjusts the passage of the switch 60. Thus, the control device 50 can be coupled to the output port of the power supply 4 or returned to its original state.

In the present embodiment, the current detector 70 is a hall sensor or a magnetic sensor, and the power supply 4 is an AC/DC, AC/AC, DC/AC, or DC/DC mode power supply.

In FIG. 3, if being coupled to an electronic device 8 without the memory 80, the power supply 4 can be manually switched to provide a required power of the electronic device.

Figure 4A:
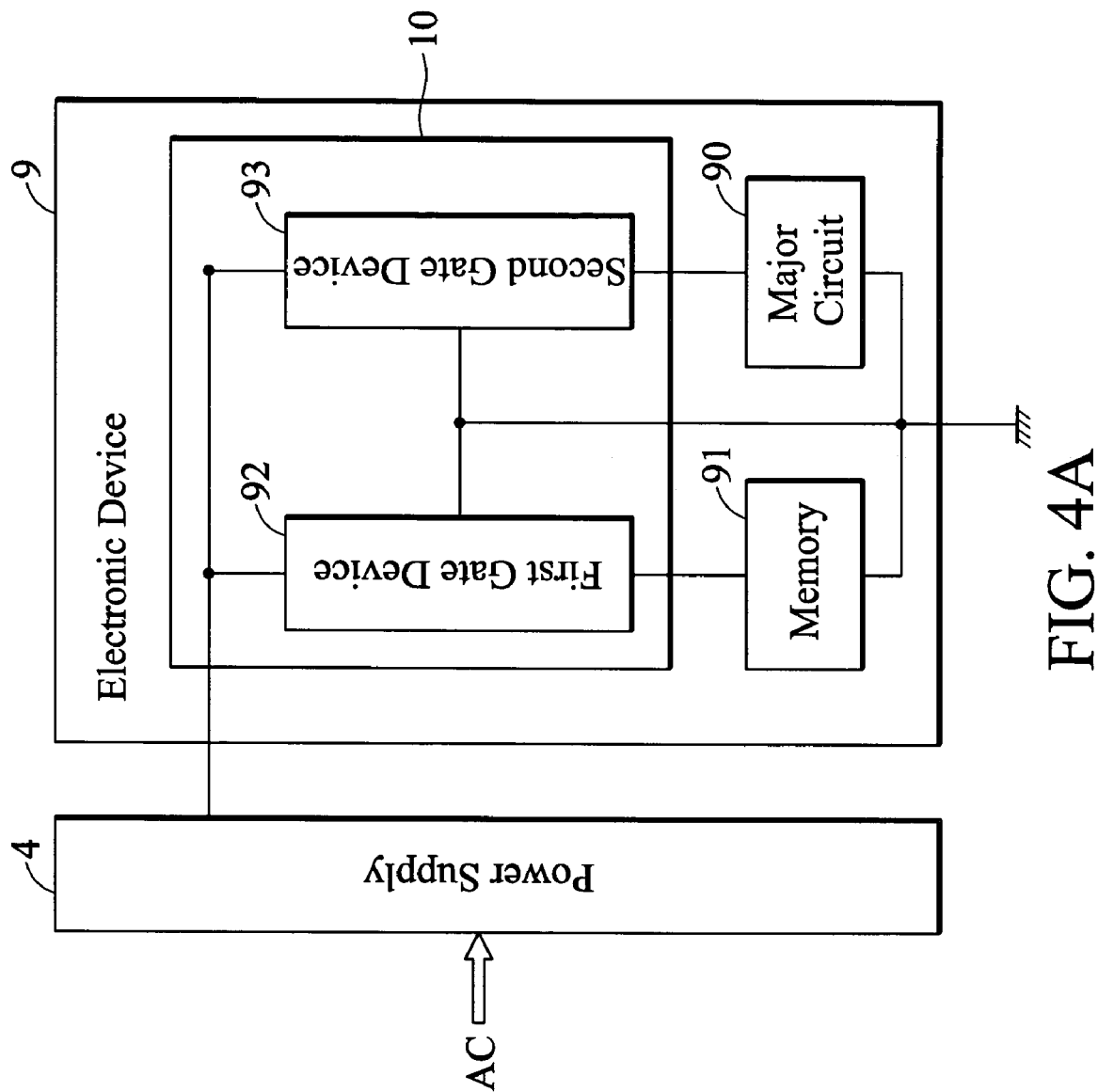
FIG. 4A is a schematic diagram of an electronic device of the invention.

FIG. 4A is a schematic diagram of an electronic device of the invention. The electronic device 9 comprises a major circuit 90, a memory 91, and a gate switch 10 having a first gate device 92 and a second gate device 93. When the electronic device 9 is coupled to the power supply 4, the gate switch 10 determines whether the voltage of the input port Vin meets a first requirement or a second requirement. When the input port Vin is coupled to an output port of the control device 50 of FIG. 3, the first gate device 92 is turned on and second gate device 93 is turned off, whereby the input port Vin can be coupled to the memory 91. Hence, the power supply 4 can detect the power information stored in the memory 91 via the first gate device 91. Additionally, if the power supply 4 provides the adjusted output power according to the power information, the first gate device 92 is turned off and the second gate device 93 is turned on, whereby the input port Vin can be coupled to the major circuit 90. Hence, the power supply 4 can provide the adjusted output power to the major circuit 90 via the second gate device 93.

Figure 4B:
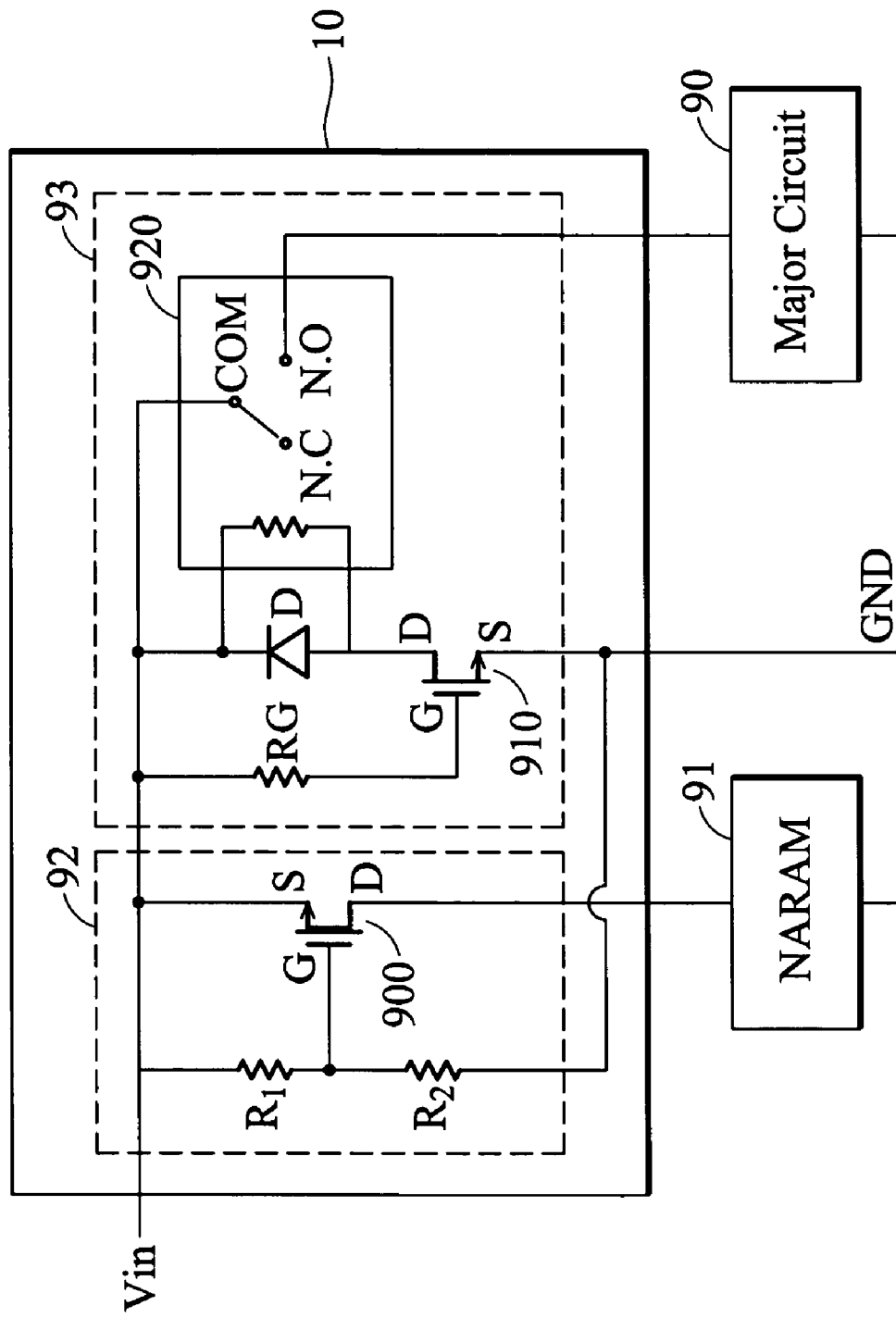
FIG. 4B is a diagram of the electronic device of FIG. 4A of the invention.

FIG. 4B is a diagram of the electronic device of FIG. 4A of the invention. The first gate device 92 comprises resistors R1 and R2 and a first transistor 900. The resistors R1 and R2 are connected in series and coupled between the input port Vin and reference node GND. The first transistor 900 is connected between the input port Vin and the memory 91, and a gate electrode of the first transistor 900 is connected to the series point of the resistors R1 and R2.

The second gate device 93 comprises a resistor RG, a second transistor 910, a diode D, and a relay 920. The resistor RG is connected between the input port Vin and the second transistor 910. The diode D is coupled to a coil of the relay 920 in parallel, and coupled between the input port Vin and the second transistor 910 in series. The relay 920 is coupled to the input port Vin via the common node COM, and coupled to the major circuit 90 via the normally opened node N.O.

Suppose that the first transistor 900 is a depletion-type MOS transistor having a −4-volt threshold voltage, the second transistor 910 is an enhancement-type MOS transistor having a 4-volt threshold voltage, and the output power of the power supply 4 is between 0V to 24V. When the voltage of the input port Vin is less than 4V, according to a divided potential of the resistor R1, the reverse bias of the gate-source pole of the first transistor 910 is between 0V to −4V, which is greater than its threshold voltage −4V, thus the first transistor 900 operates in triode area or is turned on. At the same time, according to a divided potential of a resistor RG, the forward bias of the gate-source pole of the second transistor 910 is between 0V to 4V, which is less than its threshold voltage 4V, thus the second transistor 910 operates in cut-off state or is turned off.

When the voltage of the input port Vin is between 4V to 24V, the first transistor 900 operates in cut-off state or is turned off because the reverse bias is between −4V to −24V or less than its threshold voltage −4V. At the same time, the second transistor 910 operates in saturation state or is turned on because the forward bias is between 4V to 24V or greater than its threshold voltage 4V.

The first transistor 900 or the second transistor 910 can be replaced by JFET, which is switched by a bias of its gate-source pole.

Hence, the first transistor 900 and the second transistor 910 are controlled by a detecting signal and the output power from power supply 4. When the voltage of the input port Vin equals to the detecting signal or is less than 4V, for example, the voltage of the input port Vin meets a first requirement, thus the first transistor 900 is turned on and the second transistor 910 is turned off. Additionally, when the voltage of the input port Vin equals to the output power or is greater than 4V, for example, the voltage of the input port Vin meets a second requirement, thus the first transistor 900 is turned off and the second transistor is turned on.

When the first transistor 900 is turned on, the detecting signal is provided to the memory 91 via the first transistor 90, whereby the power supply 4 can obtain the power information. Furthermore, when the second transistor 910 is turned on, the major circuit 90 is driven indirectly via the relay 920 to perform a corresponding function when receiving the output power provided by the power supply 4. The first transistor 900 is turned on when the second transistor 910 is turned off, and the first transistor 900 is turned off when the second transistor 910 is turned on.

Additionally, the electronic device 9 is also capable of being coupled to a conventional power supply. When the electronic device 9 is coupled to the conventional power supply, the voltage of the input port Vin can meets the second requirement, and the first transistor 900 is turned off and the second transistor 910 is turned on, whereby the major circuit 90 can receive the output power.

Figure 5:
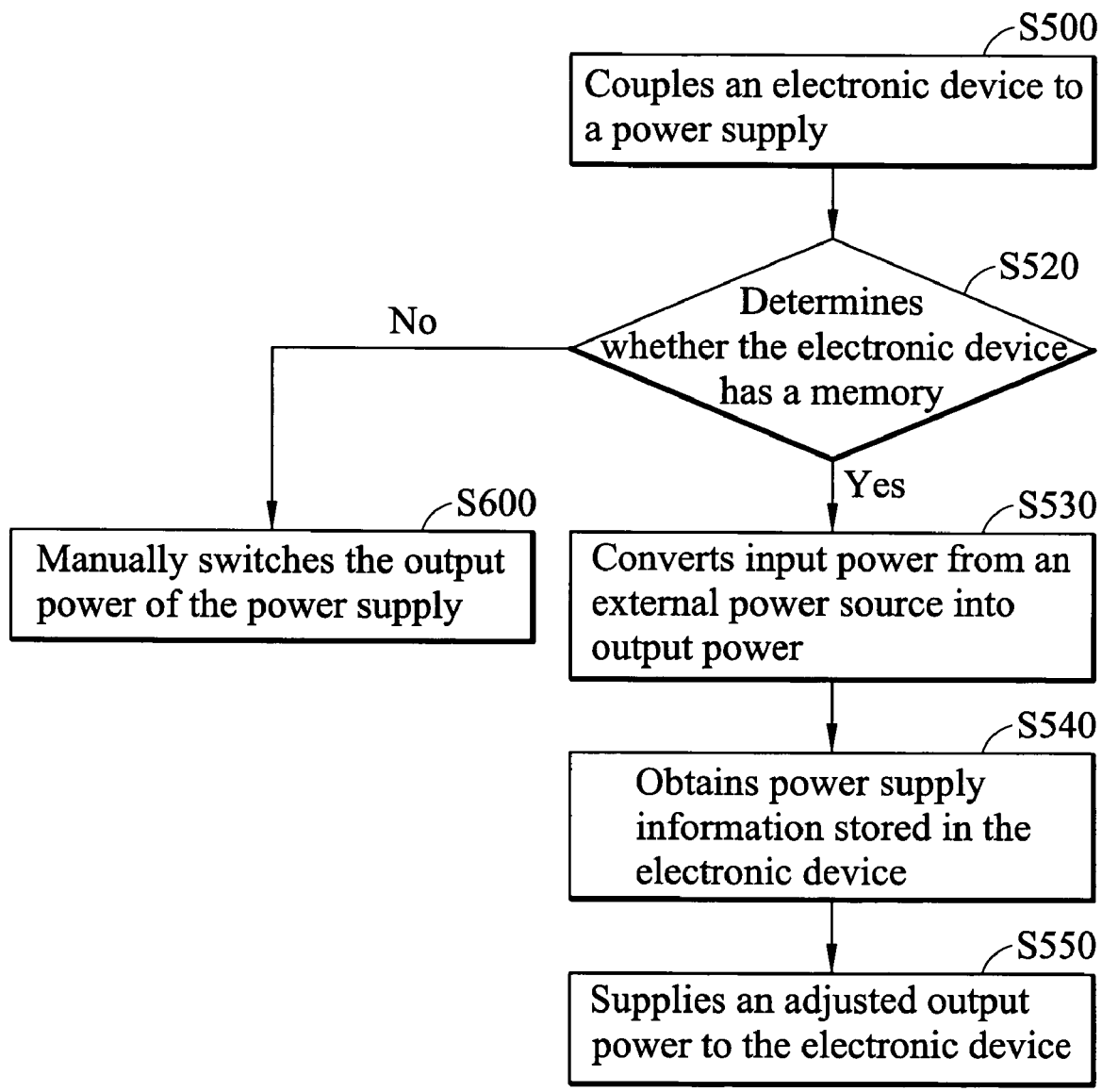
FIG. 5 shows a flowchart of the power supply control method of the invention.

FIG. 5 shows a flowchart of a power supply control method of the invention. In step S500, an electronic device is coupled to and supplied with a power supply. Step S520 follows, and the power supply transmits a detecting signal to detect whether the electronic device has a memory.

If the result of step S520 is positive, step S530 follows, and the power supply converts an input power from an external power source into an output power, and then reads and obtains power information stored in the electronic device in step S540. Subsequently step S550 follows, the output power is adjusted according to the power information and the power supply supplies an adjusted output power to the electronic device.

Adjustment of the output power can be achieved by transforming the power source into output power sources with different potential levels and selecting one of the output power sources to provide the output power to the electronic device. A controller can be employed to read the power information and accordingly sends a control signal to a selector for selection.

If the result of step S520 is negative, step S600 follows, and the output power can be manually selected to provide the electronic device with required power.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A power supply for altering an output power by detecting a power requirement of an electronic device having a memory storing power information concerning the power requirement, the power supply comprising:
    a converter for converting an input power into the output power applied to the electronic device;
    a control device coupled to the converter for reading the power information concerning the power requirement from the memory and accordingly controlling the converter to adjust the output power; and
    a switch coupled to both the converter and the control device for receiving a control signal of the control device and switching the output port of the power supply to the converter to transfer the output power from the converter to the electronic device.

2. The power supply as claimed in claim 1, further comprising a current detector coupled between the converter and the switch for detecting the output power transported to the electronic device, and, when the output power is detached from the electronic device, the switch disconnects the converter from the output port of the power supply and couples the control device to the output port.

3. The power supply as claimed in claim 2, wherein the converter comprises:
    a transformer for converting the input power into a plurality of output power sources having different potential levels;
    a potential selector controlled by the control device to accordingly select one of the power sources for the output power, thereby adjusting the output power; and
    a rectifier coupled to the potential selector for rectifying and regulating the power sources.

4. An electronic device for providing power information to a power supply, the electronic device comprises:
    a major circuit;
    an input port coupling to the power supply;
    a memory for storing the power information;
    a first gate switch coupled between the input port and the memory for controlling a detecting signal from the input port; and
    a second gate switch coupled to the input port and the major circuit;
    wherein the first gate switch is turned on and the second gate switch is turned off so that the power supply is able to access the power information stored in the memory to alter an output power of the power supply while the input port is connected to the power supply and the second gate switch receives the detecting signal, and the first gate switch is turned off and the second gate switch is turned on while the major circuit is supplied with the output power.

5. The electronic device as claimed in claim 4, wherein the first gate switch comprises a first transistor and the second gate switch comprises both a second transistor and a relay.

6. The electronic device as claimed in claim 5, the first transistor is turned on to connect the input port with the memory while the input port is connected to the power supply and receives the detecting signal.

7. The electronic device as claimed in claim 6, wherein the second transistor is turned off while the first transistor is turned on, and the second transistor is turned on while the first transistor is turned off.

8. The electronic device as claimed in claim 5, wherein the second transistor is turned on for controlling the relay to connect the input port with the major circuit.

9. A control method for a power supply coupled to an external power source, the control method comprising the steps of:
    supplying an input port of the power supply with a power source;
    transmitting a detecting signal of the power supply into an electronic device to detect a memory of the electronic device while an output port of the power supply is connected to the electronic device;
    reading an power information stored in the memory according to the detecting signal; and
    adjusting the output power of the power supply according to the power information to supply the adjusted output power to the electronic device.

10. The control method as claimed in claim 9, after adjusting the output power, further comprising the steps of:
    transmitting a control signal to a selector of the power supply, and
    switching the selector to the output port of the power supply by the control signal to output the adjusted output power to the electronic device.

11. The control method as claimed in claim 9, further comprising a step of transforming the power source into a plurality of output power sources having different potential levels while the output port of the power supply is connected to the electronic device.

12. The control method as claimed in claim 9, further comprising a step of switching manually the power source to provide the electronic device with required power while a memory detecting of the electronic device fails.

* * * * *